United States Patent [19]

Journee

[11] Patent Number: 4,956,890
[45] Date of Patent: Sep. 18, 1990

[54] DOUBLE CHANNEL BLADE FOR A WINDSHIELD WIPER

[75] Inventor: Maurice A. Journee, Reilly, France

[73] Assignee: Paul Journee S.A., Colombes Cedex, France

[21] Appl. No.: 317,664

[22] Filed: Mar. 1, 1989

[30] Foreign Application Priority Data

Mar. 2, 1988 [FR] France ................................ 88 02640

[51] Int. Cl.⁵ .................................................. B60S 1/04
[52] U.S. Cl. ............................... 15/250.36; 15/250.42
[58] Field of Search .............. 15/250.36, 250.41, 250.4, 15/250.42

[56] References Cited

U.S. PATENT DOCUMENTS

| 3,122,771 | 3/1964 | Dale ................................ 15/250.36 |
| 3,304,567 | 2/1967 | Christensen ...................... 15/250.04 |
| 3,636,583 | 1/1972 | Rosen ................................ 15/250.36 |
| 3,717,900 | 2/1973 | Quinlan et al. . |
| 4,513,468 | 4/1985 | Hayden . |

FOREIGN PATENT DOCUMENTS 12251 8/1980 European Pat. Off. .
147583 7/1985 European Pat. Off. .

Primary Examiner—Frankie L. Stinson
Attorney, Agent, or Firm—Wenderoth, Lind & Ponack

[57] ABSTRACT

A wiper blade for a windshield wiper includes a body, a working portion connected to the body, and two longitudinal channels. Such channels are connected to each other by a communication member provided at at least one end of the wiper blade. The invention is applicable for example in the automobile industry.

13 Claims, 2 Drawing Sheets

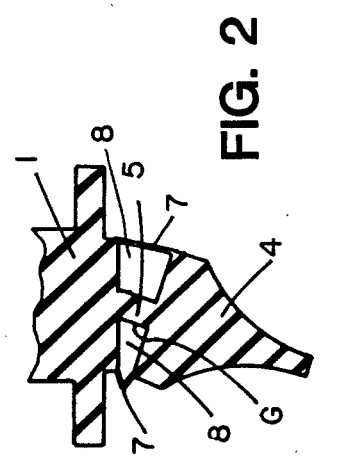
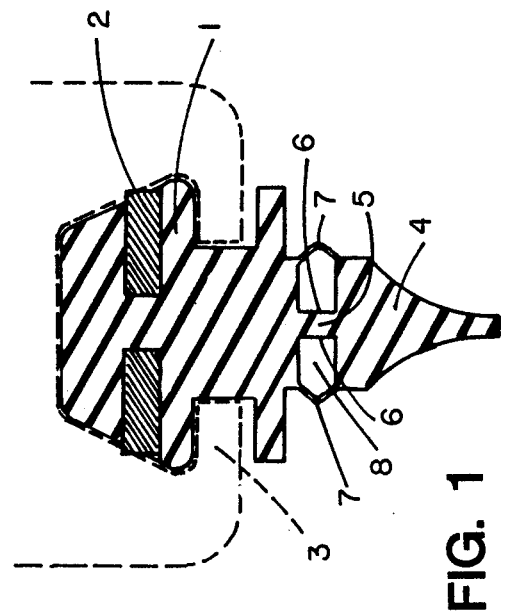
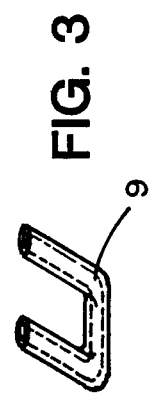
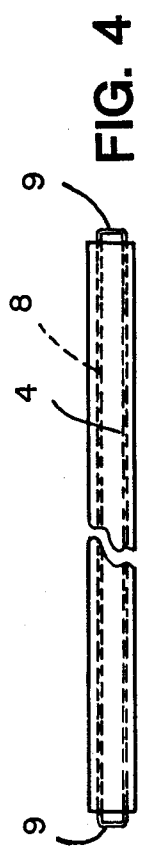

DOUBLE CHANNEL BLADE FOR A WINDSHIELD WIPER

FIELD OF THE INVENTION

This invention relates to a wiper blade for a windshield wiper, the blade being of the kind comprising a body and a working portion which is connected to the body, for example, by an articulating strip defining a groove on either side of the wiper blade.

BACKGROUND OF THE INVENTION

A wiper blade of the above kind is generally provided with a stiffening means and is held between jaws or bars of a flexible wiper arm.

Windshield wipers having blades of this known type suffer from a number of disadvantages in use. For example, the grooves formed on either side of the wiper blade detract from the appearance of the wiper itself. In addition, the grooves are liable to become blocked by snow or ice in winter, and this causes the blade to become deformed when parked or stationary, thus leading to a tendency to permanent deformation. The articulating strip itself constitutes a weak portion which leads to a risk of the wiper blade becoming torn. Furthermore, the reversals of the movement of the wiper cause severe reversals in the deformation of the working portion of the blade, and this is detrimental to the flexibility of the system in operation.

SUMMARY OF THE INVENTION

An object of the present invention is to reduce the above mentioned disadvantages of known windshield wiper blades.

According to the invention, there is provided a wiper blade for a windshield wiper, of the kind comprising a body and a working portion, and having two channels extending longitudinally, the two channels being connected to each other through communicating means at at least one end of the wiper blade.

This arrangement allows a pneumatic system to be obtained, in which compression occurs in one of the channels with corresponding decompression in the other channel, according to the direction in which the blade is moving. In addition, the air trapped in the channels increases the elasticity of the wiper blade when in the parked or stationary position.

The two channels may also be connected to each other through a further communicating means at the other end of the wiper blade. There is then a closed circuit, containing a fluid such as air, which is not in communication with the atmosphere. This further improves the qualities of the wiper blade.

In a preferred embodiment of the invention, a single communicating means is provided, connecting the two channels together at one end of the blade, with the ends of the channels at the other end of the blade being connected together through an actuator having a piston which is controlled by the movement of the wiper blade arm. The inclination of the working portion of the blade with respect to the body of the latter is thereby positively reversed by pneumatic pressure controlled by the movement of the arm, and this reduces or eliminates the risk of the blade scraping or seizing on the windshield at high speed.

Preferably, the two longitudinally extending channels are closed by means of thin and flexible longitudinally extending walls. The grooves on either side of the blade are thus closed off, and protected from snow and ice. These thin walls play a part in the deformation of the wiper blade in the parked position, and help to reduce any danger of permanent deformation. The risk of the working portion becoming torn off is considerably reduced, while in operation the blade is enabled to be substantially more flexible.

A wiper blade according to the invention is preferably made by extrusion.

The invention will be better understood from a reading of the description which follows, and which is given by way of example only, with reference to the accompanying drawings.

BRIEF DESCRIPTION OF THE DRAWINGS

FIG. 1 is a view in transverse cross-section of a wiper blade according to the invention.

FIG. 2 is a view generally similar to FIG. 1 but shows the shape of the wiper blade when in engagement with a windshield.

FIG. 3 is a diagrammatic perspective view of a hollow end piece which is used with the wiper blade of FIGS. 1 and 2.

FIG. 4 is a diagrammatic plan view of a wiper blade having two end pieces.

DESCRIPTION OF PREFERRED EMBODIMENTS OF THE INVENTION

Figure 5:
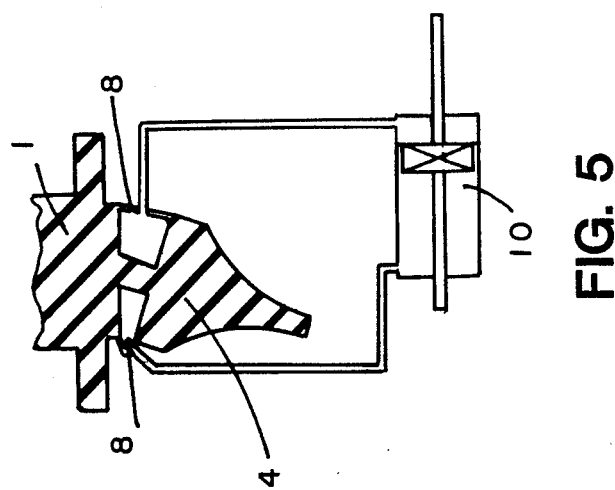
FIG. 5 is a diagram which shows a modified application of the invention.

A windshield wiper blade comprises a body 1 having stiffeners 2, which is held between fixed jaws 3 (FIG. 1) of a flexible windshield wiper linkage, not shown. A working portion 4 of the blade is connected to the body 1 through a longitudinally extending articulating strip 5. On each side of the strip 5 there is formed a longitudinally extending groove 6.

In one embodiment of the invention, each of the grooves 6 is closed by a respective thin longitudinally extending wall 7, which is formed during manufacture of the wiper blade assembly, being for example preformed by a blowing process. The grooves 6 and walls 7 thus define two longitudinally channels 8, arranged between the body 1 itself and the working portion 4 of the blade.

Because the grooves 6 are closed by the walls 7, the channels 8 cannot be seen from outside, and there is consequently no risk of their becoming blocked by snow or ice during the winter. The working portion 4, being connected to the body 1 both by the articulating strip 5 and by the walls 7, has a considerably reduced tendency to become torn off as compared with known types of wiper blades.

Deformation of the wiper blade under the pressure exerted by the wiper arm, for example as shown in FIG. 2, is reduced by virtue of the fact that one of the walls 7 is under tension and thus limits the extent of the deformation. Any resulting permanent deformation is thus reduced. The elastic deformation of the wall 7, which is reversed with the to and fro wiping movements of the windshield wiper, ensures the required flexibility in operation.

The channels 8 are connected together at one end of communicating means, which in this example comprises a hollow end piece 9, e.g. in the form of a U-shaped pipe, FIG. 3. In this arrangement, the ends of the two channels opposite the end at which the end piece engages are closed by any appropriate means, for example by further thin wall portions which again can be formed during manufacture of the wiper blade.

When the profiled member constituting the wiper blade is subjected to pressure by the blade arm and to an appropriate force to sweep it across the windshield, the inclination of the working portion 4 is such that the channel 8 which is to the rear of the blade in the direction of wiping movement (i.e. on the left as seen in FIG. 2) is compressed. This forces air out of this channel, and into the forward channel 8 via the end piece 9. When the direction of wiping changes, air is then transferred in the opposite direction between the channels.

When the wiper is parked or stationary, the volume of air trapped in the channels 8 acts as a compressible cushion, which augments the elastic properties of the rubber of which the blade is made, thus reducing any tendency to permanent deformation due to applied forces tending to cause the blade to collapse.

In the embodiment shown in FIG. 4, one hollow end piece 9 is mounted at each end of the wiper blade, in such a way that the channels 8 are connected to each other and do not communicate with the atmosphere. This improves the elastic qualities of the wiper blade, because the quantity of air enclosed in the two channels is constant, which in turn leads to an even greater flexibility in operation. In addition, the channels 8 may be filled with any desired liquid, which may be fluid or gaseous, for example hot water, anti-freeze, air, etc.

Figure 6:
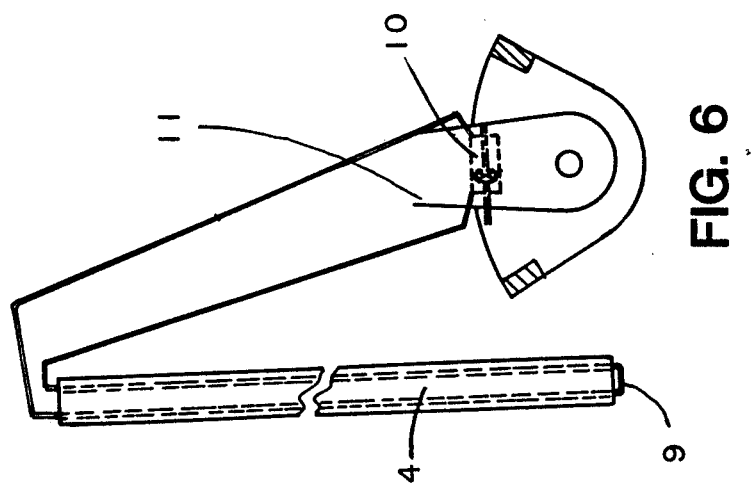
FIG. 6 is a plan view of a windshield wiper incorporating a system such as that shown in FIG. 5.

In the embodiment shown diagrammatically in FIGS. 5 and 6, there is a single hollow end piece 9, which is fitted to one end of the wiper blade. The opposite ends of the channels 8 are connected together through an actuator 10, which is controlled in such a way as to set up pneumatic pressure in the leading channel 8. The actuator 10 may be controlled by the wiper arm 11 (FIG. 6), for example by means of projections of the latter, not shown, acting on a spindle of piston of the actuator so that the position of the piston is changed at the end of each sweep of the wiper.

This pneumatic pressure produces a positive reversal of the inclination of the working portion 4 with respect to the body 1, and this tends to eliminate any risk of scraping, seizing or vibration of the wiper blade on the windshield.

The present invention is not limited to the embodiments shown, but embraces all embodiments of the invention. In particular, the longitudinally extending channels may be obtained not by closing the lateral grooves by means of walls, but by forming the channels directly in the material of the blade, which would enable the channel or channels to be given any suitable cross-section or shape, and to be located in any desired position.

It will be noted that a major advantage of the arrangements described is that the wiper blades can be made by extrusion, which represents a major contribution to the usefulness of the invention in practice.

What is claimed is:

1. A wiper blade for use with a windshield wiper, said wiper blade comprising:
   a body;
   a working portion connected to said body;
   two channels extending longitudinally through said blade; and
   communicating means, at a first end of said blade, connecting said two channels and providing communication therebetween.

2. A wiper blade as claimed in claim 1, further comprising additional communicating means, at a second end of said blade, connecting said two channels and providing communication therebetween.

3. A wiper blade as claimed in claim 2, wherein each said communicating means comprises a hollow end member in the form of a generally U-shaped pipe.

4. A wiper blade as claimed in claim 2, wherein said communicating means at said first end of said blade comprises a hollow end member in the form of a generally U-shaped pipe, and said additional communicating means at said second end of said blade comprises an actuator.

5. A wiper blade as claimed in claim 4, wherein said actuator includes a piston operable to be controlled for movement in opposite directions by a wiper arm of the windshield wiper.

6. A wiper blade as claimed in claim 1, wherein said communicating means comprises a hollow end member in the form of a generally U-shaped pipe.

7. A wiper blade as claimed in claim 1, wherein said two channels are located adjacent said working portion of said blade.

8. A wiper blade as claimed in claim 7, wherein said working portion is connected to said body by a longitudinal articulating strip defining a longitudinal groove on each of opposite sides of said blade, and further comprising thin and flexible longitudinal walls extending between said body and said working portion and across respective said grooves, thereby defining said channels.

9. A wiper blade as claimed in claim 8, wherein said thin and flexible longitudinal walls are preformed.

10. A wiper blade as claimed in claim 1, wherein said channels are filled with a fluid.

11. A wiper blade as claimed in claim 10, wherein said fluid is sealed from the surrounding atmosphere.

12. A wiper blade as claimed in claim 11, wherein said fluid comprises a liquid.

13. A wiper blade as claimed in claim 1, comprising a member formed by extrusion.

* * * * *